(12) United States Patent
Probst et al.

(10) Patent No.: US 12,073,950 B2
(45) Date of Patent: Aug. 27, 2024

(54) REPAIRING SYSTEM AS WELL AS REPAIRING METHOD

(71) Applicant: FRAMATOME GmbH, Erlangen Allemagne (DE)

(72) Inventors: Christof Probst, Nuremberg (DE); Georg Kraemer, Wiesenttal (DE); Gert Seybert, Wiesenttal (DE)

(73) Assignee: FRAMATOME GmbH, Erlangen (DE)

( * ) Notice: Subject to any disclaimer, the term of this patent is extended or adjusted under 35 U.S.C. 154(b) by 824 days.

(21) Appl. No.: 17/057,621

(22) PCT Filed: May 23, 2018

(86) PCT No.: PCT/EP2018/063574
§ 371 (c)(1),
(2) Date: Nov. 20, 2020

(87) PCT Pub. No.: WO2019/223864
PCT Pub. Date: Nov. 28, 2019

(65) Prior Publication Data
US 2021/0210230 A1   Jul. 8, 2021

(51) Int. Cl.
| | | |
|---|---|---|
| B29C 65/00 | (2006.01) | |
| G21C 17/01 | (2006.01) | |
| G21C 17/013 | (2006.01) | |
| G21C 19/20 | (2006.01) | |
| B29C 65/48 | (2006.01) | |

(52) U.S. Cl.
CPC ........... *G21C 17/01* (2013.01); *G21C 17/013* (2013.01); *G21C 19/207* (2013.01); *B29C 65/48* (2013.01); *B29C 66/0016* (2013.01)

(58) Field of Classification Search
CPC .......................... B29C 65/48; B29C 66/0016
See application file for complete search history.

(56) References Cited

U.S. PATENT DOCUMENTS

| | | |
|---|---|---|
| 5,640,096 A | 6/1997 | Alm |
| 2010/0192368 A1 | 8/2010 | Kramer et al. |
| 2015/0148949 A1 | 5/2015 | Chin et al. |
| 2016/0060887 A1 | 3/2016 | Tryber et al. |
| 2016/0155523 A1 | 6/2016 | Kramer et al. |
| 2018/0085779 A1 | 3/2018 | Bellis |

FOREIGN PATENT DOCUMENTS

| | | |
|---|---|---|
| CN | 101214715 A | 7/2008 |
| DE | 3913202 A1 | 10/1990 |
| DE | 102013108008 A1 | 1/2015 |
| JP | 2005300266 A | 10/2005 |
| JP | 2011514529 A | 5/2011 |
| JP | 2016188877 A | 11/2016 |
| WO | WO2015011270 A1 | 1/2015 |

OTHER PUBLICATIONS

Corresponding Search Report for PCT/EP2018/063574.

*Primary Examiner* — Philip C Tucker
*Assistant Examiner* — Nickolas R Harm
(74) *Attorney, Agent, or Firm* — Davidson Kappel LLC

(57) ABSTRACT

A repairing system (2) is used for applying an adhesive to a location to be repaired underwater in a container. The repairing system (2) comprises a movable and remotely controlled repairing robot (10) that is configured to be driven underwater. The repairing robot (10) comprises a repairing module (12) that is configured to be coupled with an adhesive applying module (34). The adhesive applying module (34) is configured to dispense an adhesive on the location to be repaired. Further, a repairing method is described.

10 Claims, 7 Drawing Sheets

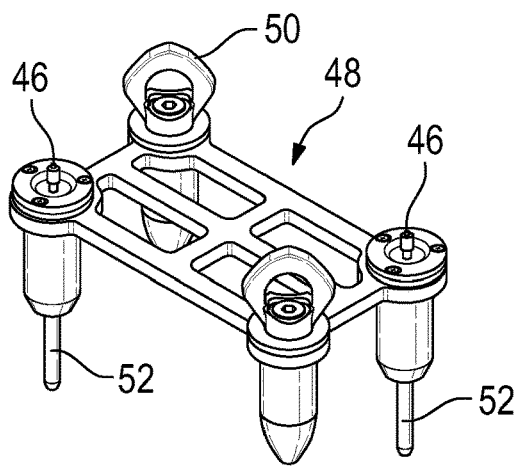
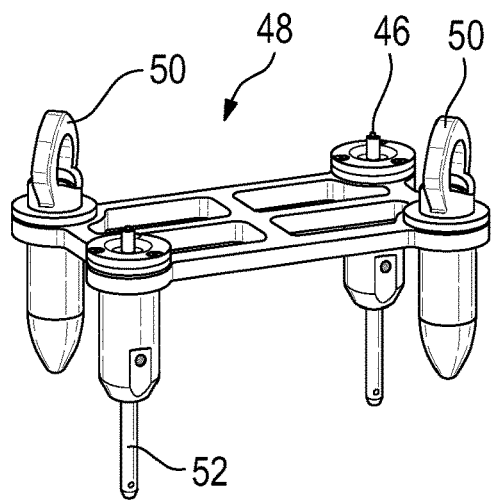
Fig. 15    Fig. 16
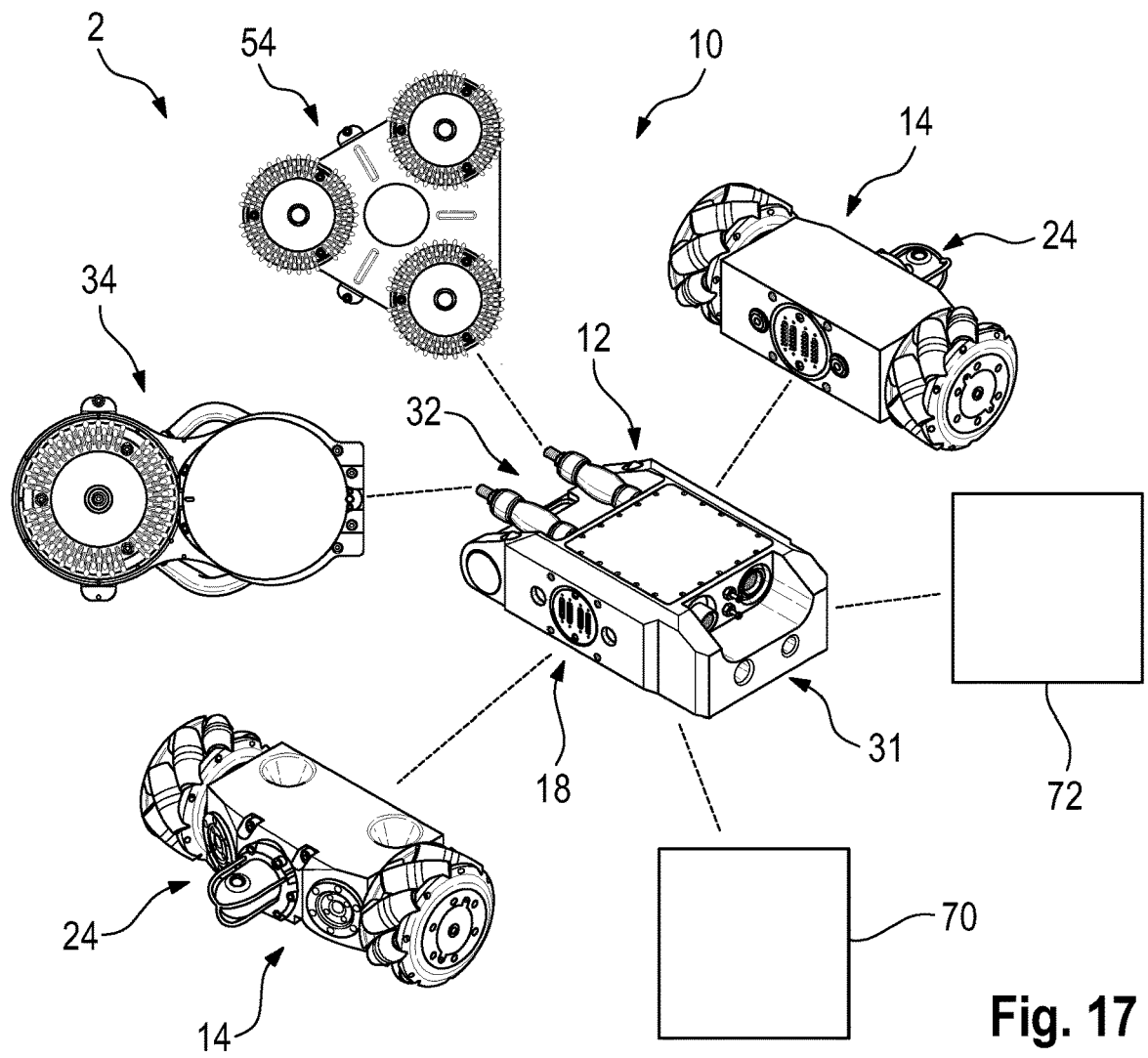
Fig. 17

REPAIRING SYSTEM AS WELL AS REPAIRING METHOD

The present disclosure relates to a repairing system for applying an adhesive to a location to be repaired underwater in a container. Further, the present disclosure relates to a repairing method to be performed underwater in a container.

TECHNICAL BACKGROUND

In a container filled with water and/or other media, for instance a reservoir like a (spent) fuel pool of a nuclear power plant, leakages may occur at certain corrosive locations due to corrosion which have to be repaired. In addition, the thickness of the wall of the respective container may be reduced due to corrosion so that such a corrosive location may also be repaired in order to fulfill certain requirements, in particular requirements for operating the container and/or a system to which the container is assigned to, for instance requirements for operating a nuclear power plant.

For repairing such a location, the container may be emptied so as to ensure access to the respective area assigned to the corrosive location in order to repair the corrosive location. However, emptying the container is very expensive, in particular depending on the contents of the container. In addition, another container is required that can be used for accommodating the contents of the emptied container.

In case of a container established by a fuel pool of a nuclear power plant, the corrosive location has to be repaired underwater since the contents of the fuel pool may be contaminated so that the contents, in particular the water or rather the media, cannot be removed from the container. Thus, the corrosive locations have to be repaired underwater.

So far, areas that can be accessed from an opening of the respective container are repaired by using a repairing system comprising an adhesive (and a repair pad or a repair overlay). The repairing system is inserted into the container via the opening that is typically assigned to the top of the container. Thus, corrosive locations could be repaired at lateral sides of the container and in certain areas of the bottom wall as these locations can be reached by the repairing systems inserted from the top of the container. For instance, WO 2015/011270 A1 and DE 39 13 202 A1 show such a repairing system to be used for repairing a corrosive location at a lateral side of the container.

However, corrosive locations may also occur in areas of the container that cannot be accessed from the top of the container such as areas assigned to the rack of fuel elements (also called fuel rack), for instance at the bottom of the container underneath the rack of fuel elements. Accordingly, the concepts for repairing corrosive locations by applying an adhesive are limited to the accessibility from the top of the container. Hence, different concepts for repairing those locations have to be used so far which are less cost-efficient and more complex with regard to the usability.

SUMMARY

An object of the present disclosure is provide an easy and cost-efficient way to repair a location to be repaired in the container irrespective of the area where the location is located.

The present disclosure inter alia provides a repairing system for applying an adhesive to a location to be repaired underwater in a container is provided, comprising a movable and remotely controlled repairing robot that is configured to be driven underwater. The repairing robot comprises a repairing module that is configured to be coupled with an adhesive applying module. The adhesive applying module is configured to dispense an adhesive on the location to be repaired.

Further, the present disclosure inter alia provides a repairing method to be performed underwater in a container, with the following steps:
  Driving a movable and remotely controlled repairing robot underwater to a location to be repaired within the container, and
  Applying an adhesive on the location to be repaired underwater.

The present disclosure is based on a repairing system and a repairing method wherein an adhesive is applied to a location to be repaired underwater, for instance a corrosive location, by using a movable and remotely controlled repairing robot. The respective repairing robot can be driven to the respective area so that the adhesive can be applied at the respective location. The usage of the movable and remotely controlled repairing robot ensures that the adhesive used can be applied to all locations within the container. Thus, the repairing is no more restricted to certain areas of the container in comparison to the conventional repairing systems used before for applying an adhesive to the location to be repaired. Moreover, it is also not necessary to empty the container for repairing the respective location to be repaired provided that the location is assigned to an area that cannot be accessed from the top of the container. In fact, the movable and remotely controlled repairing robot is driven to the respective area underwater so that all locations within the container can be accessed.

Generally, the location to be repaired may correspond to a corrosive location, a location with a mechanical damage, for instance induced by an object, and/or stress such as mechanical stress and/or thermal stress. Further, the location to be repaired may relate to a location having a reduced wall thickness. Alternatively or additionally, a leakage may occur at the respective location via which a medium may leak into the underground.

Furthermore, the repairing may be preventive so as to avoid an upcoming damage, for instance a corrosive damage that may result in a leakage.

Thus, the location to be repaired may relate to a location that is not corrosive or that has any kind of damage. However, the location to be repaired may be identified as being prone to a damage so that it should be repaired in a preventive manner.

Accordingly, the repairing system may be used to avoid a damage in the future. Thus, the repairing system generally also corresponds to a preventive repairing system.

The movable and remotely controlled repairing module is part of the repairing robot that is driven underwater in the container. In fact, the repairing module corresponds to the main module of the repairing robot.

Accordingly, the movable and remotely controlled repairing robot is at least assigned to a drive, in particular an electric motor. The drive may be integrated within the movable and remotely controlled repairing robot, for instance in the repairing module.

The movable and remotely controlled repairing robot may also be called movable and remotely controlled repairing crawler or rather movable and remotely controlled repairing manipulator.

The repairing system and the repairing method may generally be used in a (spent) fuel pool underwater, namely in an acidic medium, for instance in a medium comprising boron acid.

The adhesive can be established by a self-leveling adhesive which is applied on the location to be repaired easily via the adhesive applying module. For instance, the adhesive is a polymer adhesive, in particular an epoxy adhesive. The adhesive itself may be radiation resistant. Moreover, the adhesive may be a two-component adhesive being mixed prior to its application.

According to an aspect, the repairing module is configured to be coupled with a cleaning module in particular wherein the cleaning module is configured to be coupled with a filter and/or a suction member. Thus, the location to be repaired can be cleaned by using the cleaning module appropriately. The respective location to be repaired is cleaned prior to the application of the adhesive so that good adhesion properties are ensured.

The suction member is configured to suck up the material that occurs during the cleaning.

The filter may be assigned to the suction member so that the material sucked up is filtered appropriately. In the filter, the material is collected so that it can be emptied easily.

The filter may be placed within the container as well during the cleaning process.

The repairing module is generally configured in a modular manner so that different modules can be connected with the repairing module, for instance the adhesive applying module and/or the cleaning module.

Hence, the respective repairing robot may comprise two or more modules, for instance the repairing module as well as the adhesive applying module or the cleaning module.

For instance, the cleaning module comprises at least one cleaning brush unit, in particular wherein the cleaning brush unit has three brushes each being formed in a substantial circular manner. The cleaning brush unit ensures that the respective location is cleaned by brushing. Deposits and/or residues can be brushed away from the location to be repaired so that the respective location is cleaned.

The three brushes of the cleaning brush unit can be driven so that they rotate for cleaning the respective location. The different brushes can be controlled separately and/or commonly, for instance depending on a certain cleaning mode of the repairing system.

In addition, the cleaning brush unit may be assigned to the suction member. The suction member is configured to suck up the material that is removed by the brush(es) of the cleaning brush unit.

According to another aspect, the adhesive applying module comprises an appliance brush, in particular wherein the appliance brush is formed in a circular manner. Thus, the adhesive to be applied on the location to be repaired is brushed onto the respective location so that the adhesive is distributed over the location to be repaired, in particular in a uniform manner.

The adhesive may be applied by moving the repairing robot forwards and backwards, for instance by 5 to 100 cm/min, while the adhesive is applied so that the appliance brush distributes the adhesive.

For instance, the adhesive is applied via a nozzle, for instance a conventional one.

Moreover, the appliance brush may be rotated during applying the adhesive, for instance by 1 to 300 rounds per minute, so that the adhesive is brushed in.

Alternatively, the brush is not rotated during the adhesive appliance.

The adhesive applied may have a width of 100 to 200 mm depending on the shape of the appliance brush. The thickness of the adhesive applied on the location to be repaired may vary between 0.5 and 10 mm.

Generally, applying the adhesive by using the (rotating) appliance brush ensures that the medium surrounding the location to be repaired, for instance an acidic medium such as water comprising boron acid, is pushed away (displaced) so that the location to be repaired is laid bare. Hence, the adhesive can be applied to the location to be repaired directly. This improves the adhesive appliance underwater.

In addition, the appliance brush may also be used for cleaning purposes so that the adhesive appliance module may also correspond to the cleaning module. For instance, the appliance brush is rotated for cleaning purposes without dispensing any adhesive so that the appliance brush corresponds to a cleaning brush since no adhesive is dispensed which could be brushed in.

Moreover, the adhesive applying module may have an outlet for dispensing the adhesive on the location to be repaired, wherein the outlet is assigned to the appliance brush, in particular wherein the appliance brush is provided in a concentric manner around the outlet. The medium surrounding the location to be repaired is pushed away by the (rotating) appliance brush so that the adhesive can be applied in the area excavated by the appliance brush.

Another aspect provides that an adhesive supply module is provided that is fluidly coupled with the adhesive applying module so that the adhesive is supplied to the adhesive applying module via the adhesive supply module. The adhesive supply module may be part of the repairing robot wherein the adhesive supply module may correspond to an interface for the repairing robot with a separately formed machine which provides the adhesive to be applied. Hence, the adhesive is supplied to the adhesive applying module via the adhesive supply module.

For instance, the adhesive supply module is connected to the respective machine via at least one of a hose, a conduit, a pipe, a line or any other suitable member for supplying the adhesive from the machine to the repairing robot, in particular the adhesive applying module.

The adhesive supply module may be connected to the moveable and remotely controlled repairing robot, for instance the movable and remotely controlled repairing module or another module being connected to the movable and remotely controlled repairing module.

Moreover, the repairing module may be configured to be coupled with a location finding module and/or a leakage determination module, in particular an alternating current field measurement module (ACFM module) and/or a vacuum box module. The ACFM module ensures that a corrosive location can be localized easily. Accordingly, the corrosive locating finding module can be used for localizing spots that are critical with regard to a leakage and/or a wall thickness being lower than required. For instance, the ACFM technique is used for localizing those critical spots. By using the leakage determination module, it can be verified whether a leakage is provided or not since the respective amount of leakage can be determined appropriately, for instance by using the vacuum box module.

For instance, the repairing module is configured to be coupled with at least one driving module comprising at least one wheel, for instance a Mecanum wheel, an omni wheel or a poly wheel, in particular wherein the repairing module comprises two driving interfaces configured to be coupled with a corresponding driving module each. Accordingly, the movability of the repairing robot is ensured by the at least one driving module that is coupled with the repairing module.

The respective wheel, in particular the Mecanum wheel, omni wheel or poly wheel, ensures that the repairing robot can be moved in any direction. Moreover, the repairing robot is configured to change its direction easily by controlling the wheel appropriately.

Typically, the repairing module may be coupled with two driving modules being assigned to two opposite sides wherein each driving module comprises two wheels, for instance two Mecanum wheels, so that the moveable and remotely controlled repairing robot has four wheels, for instance four Mecanum wheels.

In addition, at least one camera module may be provided, in particular wherein the camera module is assigned to the at least one driving module. The camera module ensures that a user of the repairing system is enabled to control the repairing robot remotely while taking the pictures into account that are provided by the camera module. Hence, the user is enabled to observe the environment of the repairing robot underwater, in particular to explore spots which might have corrosive locations for investigating these locations. Hence, the user may control the repairing robot appropriately so that it is driven to the spots identified as potential critical ones.

Another aspect provides that the repairing module has a functional interface configured to be coupled with the adhesive applying module and the cleaning module selectively. Thus, a single functional interface is provided that can be coupled with different modules, namely the adhesive applying module and the cleaning module, depending on the desired usage of the repairing system or rather depending on the operation mode of the repairing system.

Hence, the repairing robot may comprise the repairing module, the at least one driving module as well as the adhesive applying module or the cleaning module depending on the operation mode of the repairing system.

As mentioned earlier, the location to be repaired may be cleaned prior to the adhesive appliance so that the repairing module may be coupled with the cleaning module in order to clean the respective location to be repaired previously. Afterwards, the cleaning module may be decoupled from the repairing module which is then coupled with the adhesive applying module. The same functional interface is used for coupling the respective modules. Alternatively, the appliance brush of the adhesive applying module may also be used for cleaning purposes so that the adhesive applying module is also the cleaning module. In other words, the repairing robot with the adhesive applying module may be operated in two different modes, namely a cleaning mode and an adhesive appliance mode.

In general, the movable and remotely controlled repairing robot may be constructed modularly. As already mentioned, the repairing robot corresponds to the unit of the system that is driven underwater wherein the repairing robot is connected with other components of the repairing system which are located next to the container, for instance at the pool edge or the reactor floor. The repairing robot comprises the central repairing module that provides the respective interfaces for connecting further modules so that the repairing robot is established in a modular manner. Hence, different modules may be connected to the repairing module which ensures different functionalities of the repairing robot.

Generally, the system, in particular the repairing robot, may additionally comprise a cleaning module, a corrosive location finding module, a leakage determination module, at least one driving module, at least one camera module, a suspension module and/or an adhesive supplying module, in particular wherein the system further comprises a control unit and/or an adhesive mixing machine.

The system, in particular the repairing robot, may also comprise the adhesive applying module.

The repairing module is generally configured in a modular manner so that different modules can be connected with the repairing module simultaneously and/or subsequently. As already mentioned, the repairing module corresponds to the main module of the repairing robot as well as the repairing system. Accordingly, a compact repairing system is provided since different modules can be connected with each other in order to provide the desired functionalities of the repairing robot.

For instance, the suspension module as well as the adhesive supplying module may be established by a single functional unit, namely a suspension and supplying unit, so that the suspension as well as the adhesive supplying is ensured by a single unit as both functionalities are required at the same time.

Since the repairing robot is configured to be driven underwater in a remotely controlled manner, at least a separately formed control unit is used for controlling the remotely controlled repairing robot underwater. The control unit may be located outside of the container, for instance at a pool edge or a reactor floor next to the fuel pool.

Further, the adhesive to be applied to the location to be repaired underwater is provided by an adhesive mixing machine being placed beside the container so that the adhesive mixed by the adhesive mixing machine is supplied to the adhesive applying module. For instance, the adhesive mixing machine may comprise a pump unit for pumping the adhesive mixed to the repairing robot located underwater for repairing the respective location underwater.

Generally, the adhesive mixing machine may mix the adhesive to be applied by mixing two components, for instance mixing a two-component adhesive. The adhesive may inter alia comprise a resin as well as a hardener (curing agent).

An aspect provides that the adhesive is brushed on the location to be repaired underwater. As mentioned earlier, the adhesive can be brushed by using an appliance brush that may be driven so as to rotate appropriately.

Furthermore, the location to be repaired may be cleaned prior to the appliance of the adhesive so that any deposits and/or residues may be removed prior to the appliance of the adhesive. The cleaning can be done by the appliance brush and/or a separately formed cleaning brush unit.

The location to be repaired may be localized by using an alternating current field measurement (ACFM) technique and/or an amount of leakage may be determined. Accordingly, the location to be repaired can be localized in a precise manner wherein it may be further identified whether or not a leakage is provided by determining the amount of leakage if provided.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 15 shows a perspective view of the combined suspension module and adhesive supplying module, FIG. 16 shows another perspective view of the combined member shown in FIG. 15, and FIG. 17 shows another overview of the repairing robot of the repairing system according to the present disclosure illustrating the modular structure of the repairing robot.

DETAILED DESCRIPTION

Figure 1:
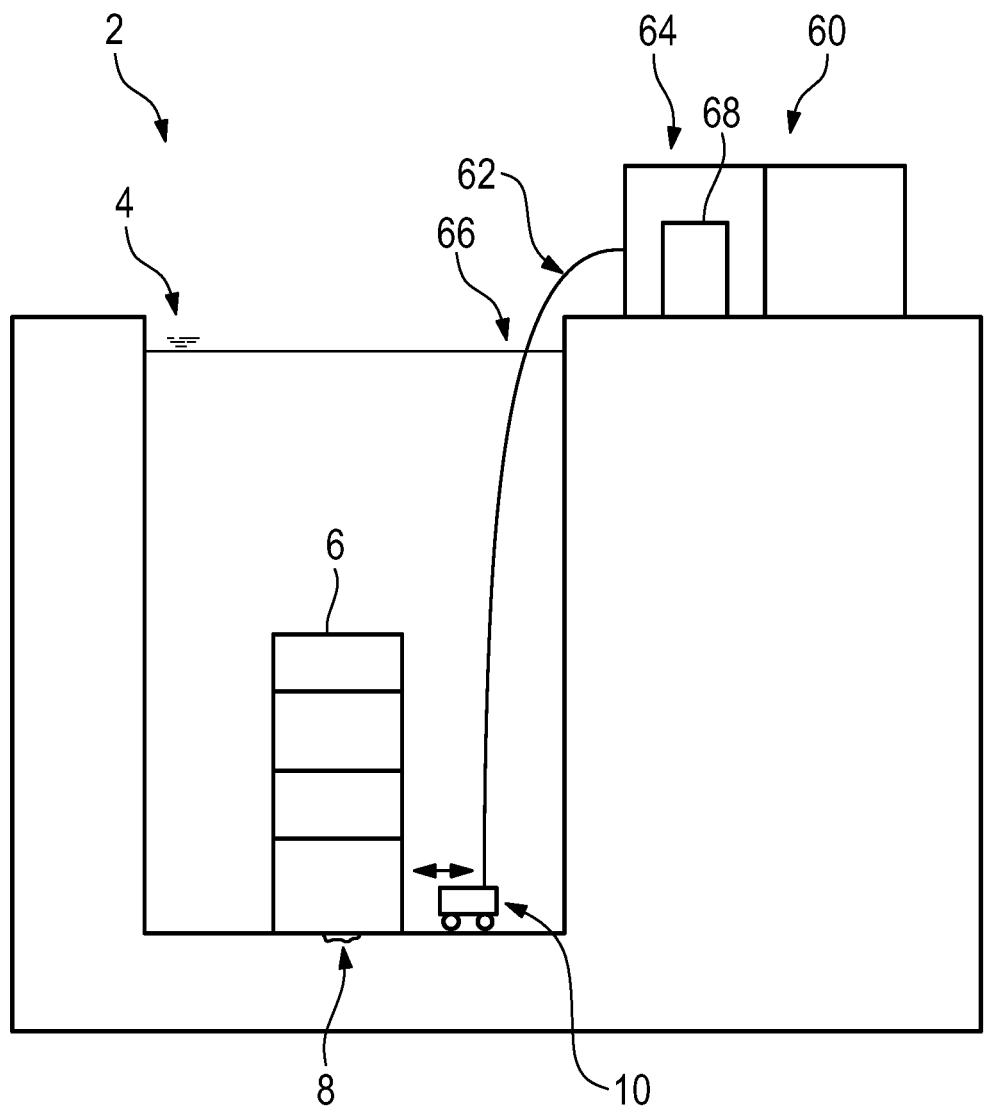
FIG. 1 shows a schematic view of a repairing system according to the present disclosure.

In FIG. 1, a repairing system 2 is shown that is used for performing repairs underwater.

In the shown embodiment, the repairing system 2 is used in conjunction with a container 4 filled with a medium wherein a rack 6 is placed within the container 4. For instance, the container 4 corresponds to a (spent) fuel pool of a nuclear power plant such that the rack 6 is a rack of fuel elements (also called fuel rack). Hence, the medium within the container 4 corresponds to an acidic medium, for instance in a medium comprising boron acid.

In the container 4, a location to be repaired 8 may be provided that has to be repaired by the repairing system 2 underwater, namely in the acidic medium. For instance, the location to be repaired 8 is located under the rack 6 so that the respective location 8 cannot be reached from the top of the container 4.

The location to be repaired 8 may correspond to a corrosive location that reduces the wall thickness of the respective wall of the container 4, namely the bottom wall. Alternatively or additionally, a leakage may occur via which the medium may leak into the underground.

The location to be repaired 8 may also correspond to a location with a mechanical damage and/or stress, for instance mechanical stress or rather thermal stress.

Moreover, the location to be repaired 8 may be a location that is prone to a damage or failure in the future so that the respective location is repaired proactively or rather in a preventive manner.

For repairing the location to be repaired 8, the repairing system 2 comprises a movable and remotely controlled repairing robot 10 that can be used for applying an adhesive to the location to be repaired 8 underwater in the container 4 as will be discussed later.

The moveable and remotely controlled repairing robot 10 as well as its components are shown in FIGS. 2 to 17 in more detail.

Figure 2:
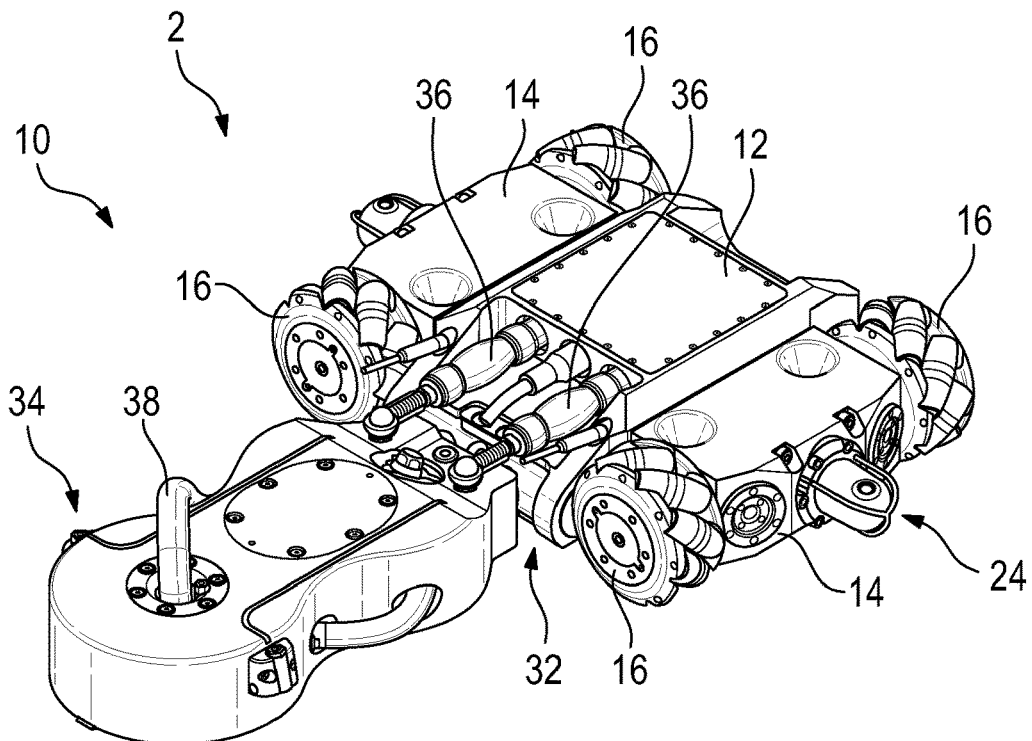
FIG. 2 shows a perspective view of a repairing robot used by the repairing system of FIG. 1.

FIG. 2 reveals that the moveable and remotely controlled repairing robot 10 comprises a repairing module 12 that is connected with two driving modules 14 each comprising two wheels 16. As shown in FIG. 2, the wheels 16 of the driving modules 14 are established by Mecanum wheels ensuring a high movability of the repairing robot 10.

Figure 7:
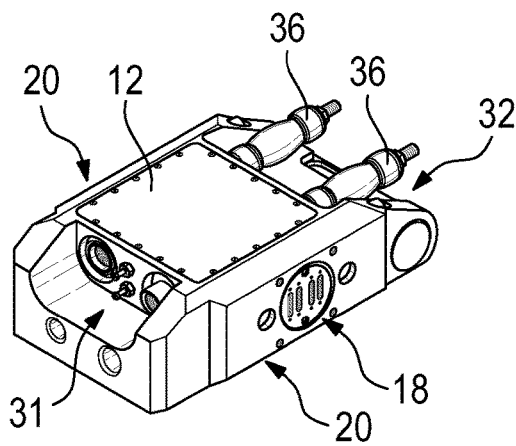
Figure 8:
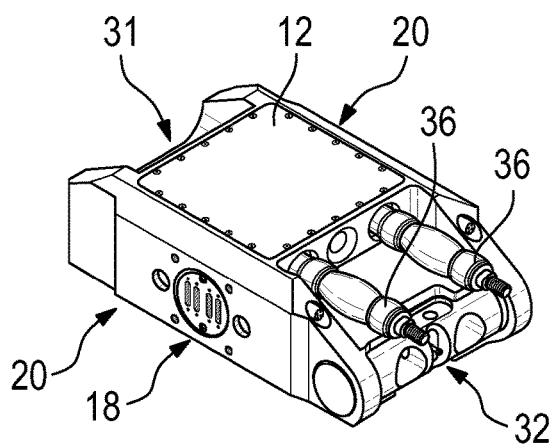
FIG. 8 shows another perspective of the repairing module of FIG. 7.

The repairing module 12 is solely shown in FIGS. 7 and 8 wherein it becomes obvious that the repairing module 12 has two driving interfaces 18 being assigned to two opposite sides 20 of the repairing module 12. The driving interfaces 18 are configured to be connected with the driving module 14 each.

Figure 9:
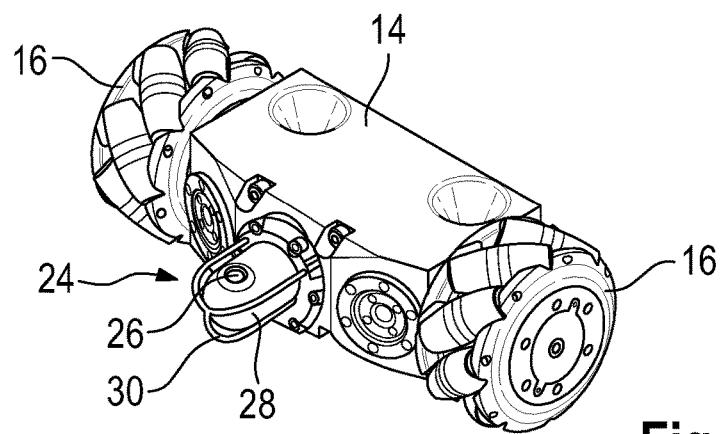
FIG. 9 shows a perspective view of a driving module used by the repairing robot shown in FIG. 2.
Figure 10:
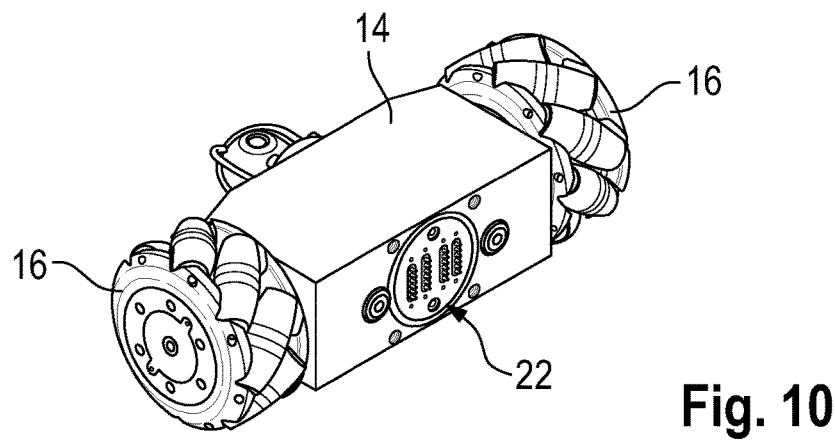
FIG. 10 shows another perspective view of the driving module of FIG. 9.
Figure 11:
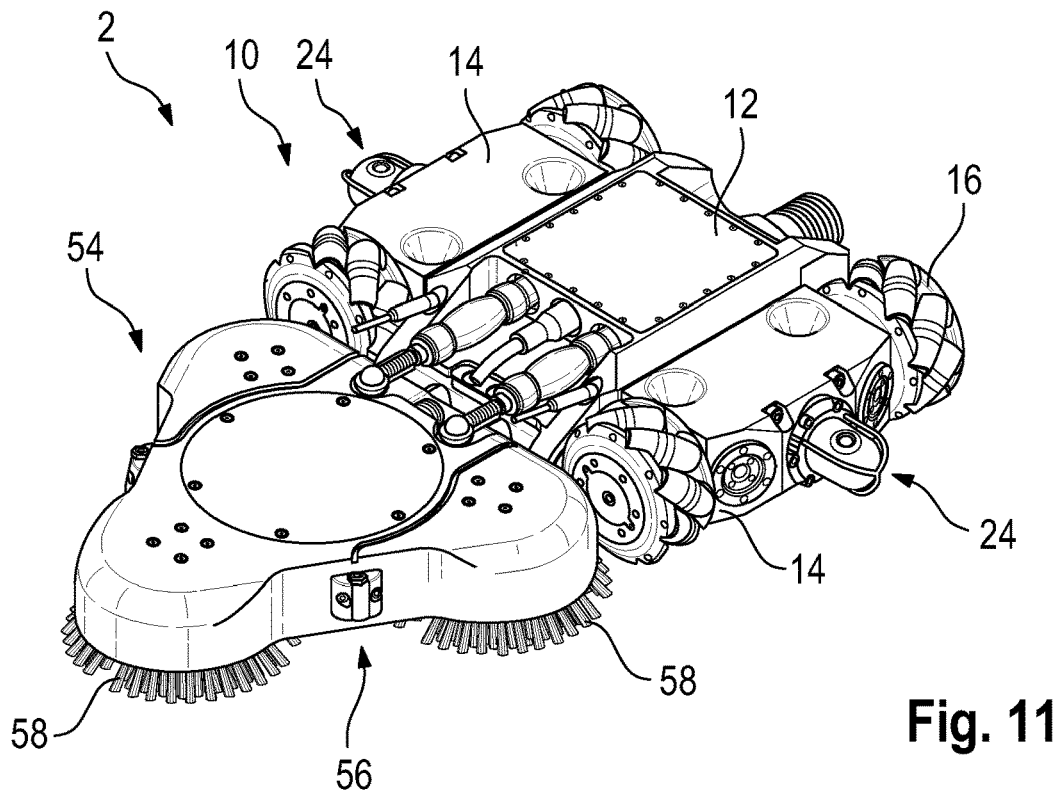
FIG. 11 shows the repairing robot of the repairing system of FIG. 1 in another operation mode.

The respective driving modules 14 are shown in FIGS. 9 and 10 solely. In these Figures, it becomes obvious that the driving modules 14 comprise corresponding interfaces 22 via which the driving modules 14 can be coupled with the repairing module 12, in particular the driving interfaces 18.

For instance, the repairing module 12 comprises a drive such as an electric motor which is used for controlling the respective wheels 16 of the driving modules 14.

Further, the repairing robot 10 comprises at least one camera module 24 that provides image so that the user of the repairing system 2 is enabled to observe the environment of the repairing robot 10 while the repairing robot 10 is driven underwater.

For this purpose, the camera modules 24 each have at least one camera 26 being assigned to a moveable camera holder 28 which may be protected by a surrounding protection member 30 like a cage. The moveable camera holder 28 ensures that the at least one camera 26 can be moved, in particular swiveled or rotated, so that the environment of the repairing robot 10 can be observed in all dimensions.

In the shown embodiment, the repairing robot 10 comprises two camera modules 24 wherein the camera modules 24 are assigned to the driving modules 14. Particularly, each driving module 14 comprises one camera module 24.

The camera module 24 is located at a side of the driving module 14 being opposite to the interface 22 via which the driving module 14 is connected to the repairing module 12. Thus, the repairing module 12 is sandwiched between both driving modules 14 wherein the respective camera modules 24 face the outside of the repairing robot 10 so that the environment can be observed.

The data related to the pictures recorded, in particular a video, are forwarded to the repairing module 12 via the respective interfaces 18, 22.

In addition, the repairing module 12 has a control interface 31 which is configured to be connected with a separately formed control unit, for instance via wires, cables or any other suitable signal transmitting member- Moreover, the repairing module 12 has a functional interface 32 that is configured to be coupled with other modules, for instance an adhesive applying module 34 as shown in FIG. 2 illustrating an adhesive applying mode of the repairing robot 10.

The functional interface 32 is assigned to a side of the repairing module 12 being substantially perpendicular to the sides 20 at which the driving interfaces 18 are located. Moreover, the functional interface 32 is opposite to the control interface 31.

Accordingly, the control interface 31, the functional interface 32 as well as the driving interfaces 18 are each assigned to different sides of the repairing module 12.

As shown in FIG. 2, the adhesive applying module 34 is connected with the repairing module 12 via two connecting members 36. The connecting member 36 may each comprise a bolt via which the adhesive applying module 34 is fixedly connected to the repairing module 12.

In general, the adhesive applying module 34 is configured to dispense an adhesive on the location to be repaired 8. For this purpose, the adhesive applying module 34 comprises a hose 38 via which the adhesive to be applied is forwarded to an outlet 40 of the adhesive applying module 34; please refer to FIG. 4.

Alternatively, the adhesive applying module 34 may comprise a tube, a sleeve and/or a pipe for forwarding the adhesive to be dispensed to the outlet 40.

Figure 4:
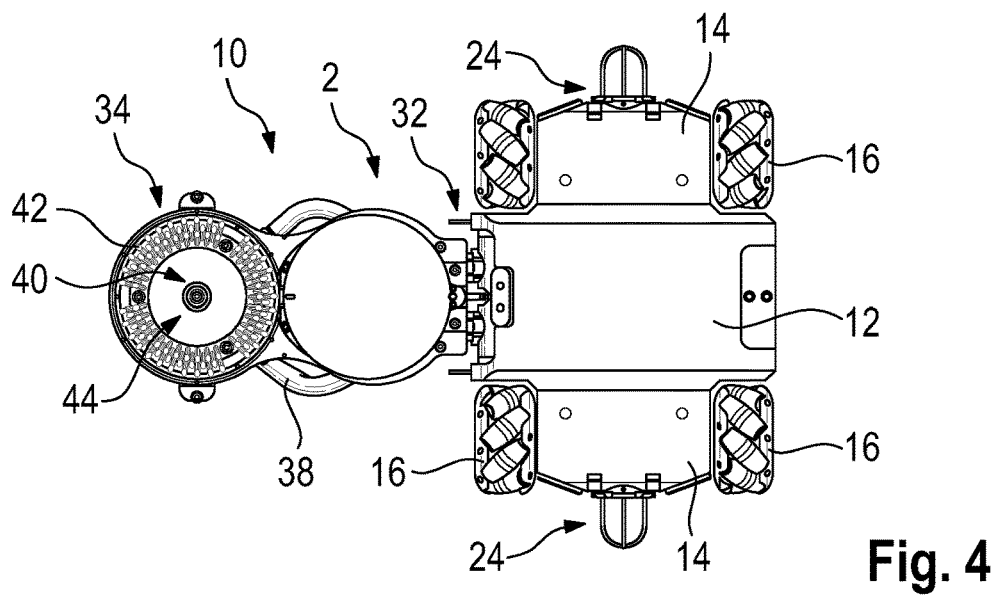
FIG. 4 shows a bottom view of the repairing robot shown in FIG. 2.
Figure 5:
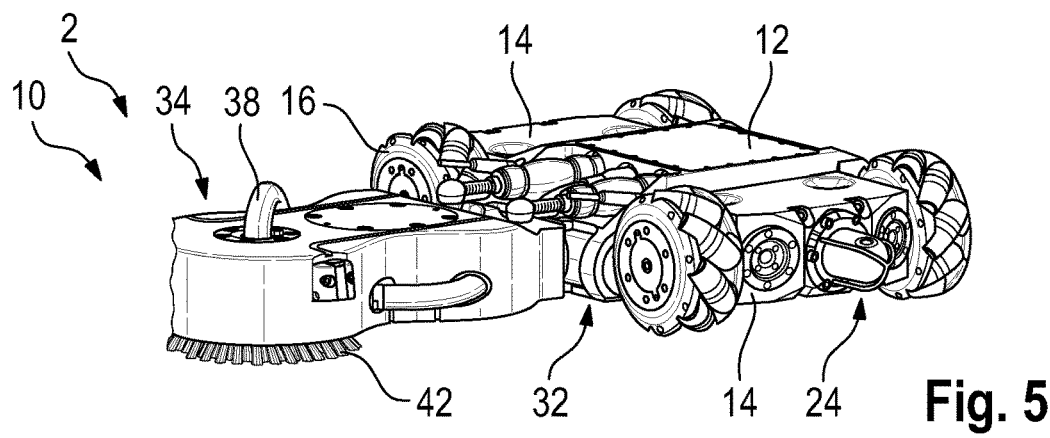
FIG. 5 shows another perspective view of the repairing robot shown in FIG. 2.
Figure 6:
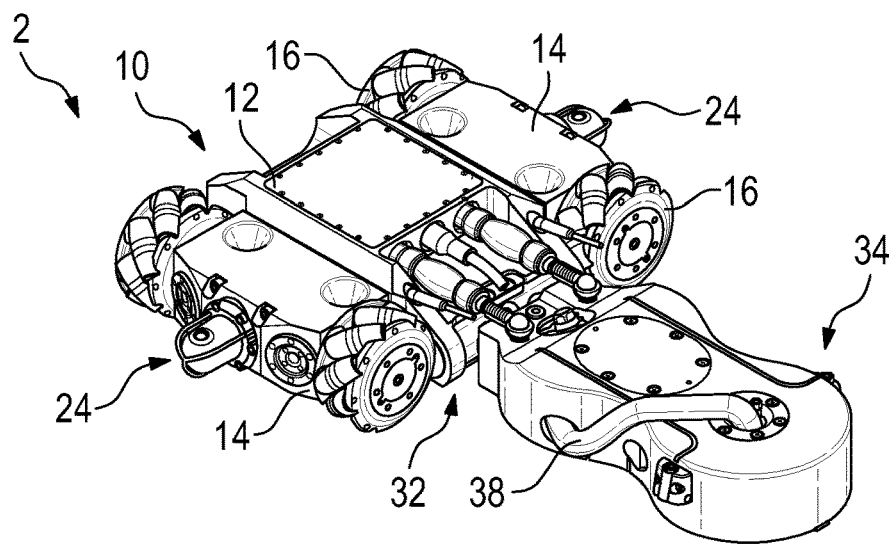
FIG. 6 shows another perspective view of the repairing robot shown in FIG. 2, FIG. 7 solely shows the repairing module of the repairing robot of FIG. 2 in a perspective view.

As shown in FIG. 4, the adhesive applying module 34 also comprises an appliance brush 42 that is formed in a substantially circular manner wherein three arc-shaped portions of the appliance brush 42 are provided. The appliance brush 42 is located in a concentric manner about the outlet 40 so that the radial distance between the outlet and the appliance brush 42 is substantially the same.

The appliance brush 42 can be driven so that it rotates while the adhesive is applied to the location to be repaired 8 underwater. By doing so, the medium surrounding the location to be repaired 8 is pushed away due to the rotation of the appliance brush 42 so that the location to be repaired 8 is laid bare. Hence, it is ensured that the adhesive can be applied directly on the location to be repaired 8 improving the adhesion properties of the adhesive applied.

Furthermore, the repairing robot 10 is moved forwards and backwards while the adhesive is applied to the location to be repaired 8 such that the adhesive is brushed in via the appliance brush 42.

As shown in FIG. 4, the adhesive applying module 34 has an appliance surface 44 that is encircled by the appliance brush 42. The appliance surface 44 comprises the outlet 40 in its center.

The appliance surface 44 may be curved with respect to the appliance level, for instance in a concave manner, so that a space between the wall comprising the location to be repaired 8 and the outlet 40 is provided due to the shape pf the curved appliance surface 44.

Figure 3:
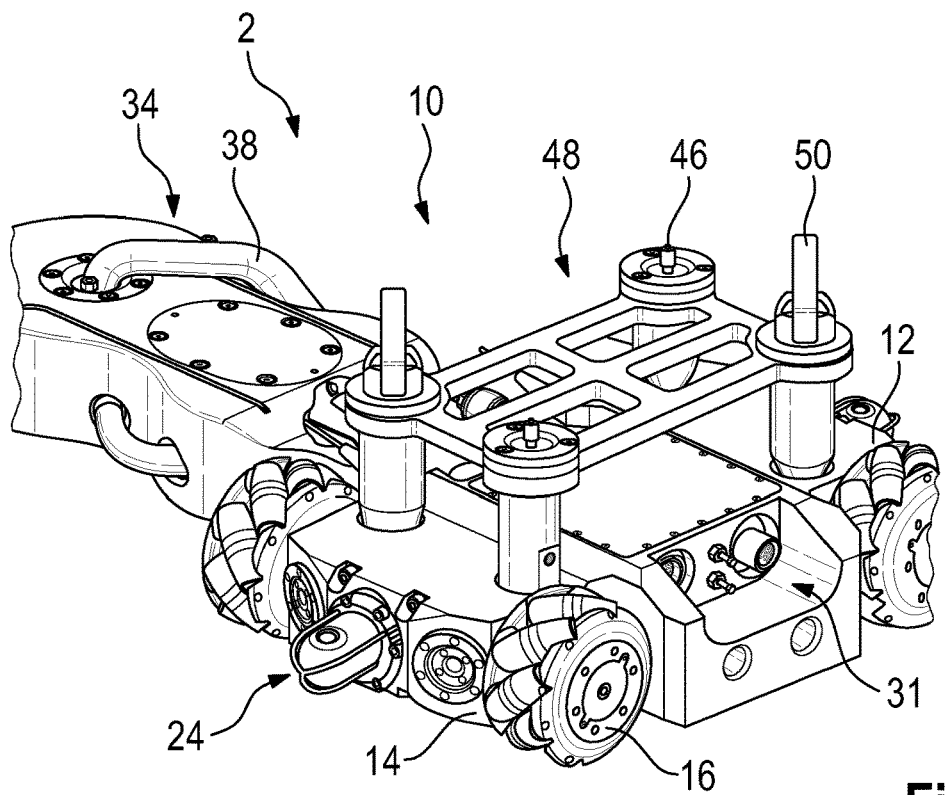
FIG. 3 shows another perspective view of the repairing robot shown in FIG. 2 wherein a suspension module and an adhesive supplying module is provided.

In FIG. 3, it is shown that the repairing robot 10 comprises an adhesive supply module 46 that is positioned on top of the repairing robot 10 wherein the adhesive to be applied via the outlet 40 is supplied to the adhesive applying module 34 via the adhesive supply module 46. Therefore, the adhesive supply module 46 is fluidly coupled with the adhesive applying module 34.

In the shown embodiment, the adhesive supply module 46 is connected to the driving modules 14 each having respective openings for accommodating the adhesive supply module 46 which becomes obvious in FIG. 2 as well as FIGS. 9 and 10. Hence, the adhesive to be applied is supplied to the respective interiors of the driving modules 14 which are fluidly coupled with the adhesive applying module 34 via the repairing module 12.

The adhesive supply module 46 is established by a functional unit 48 that also comprises a suspension module 50 via which the repairing robot 10 is positioned within the container 4, for instance via a crane. Hence, the suspension module 50 ensures that the repairing robot 10 can be abseiled appropriately.

The functional unit 48 may correspond to a common suspension and supplying unit since both functionalities are established by the common functional unit 48.

The respective functional unit 48 is shown in more detail in FIGS. 15 and 16. These Figures reveal that the functional unit 48 is separately formed with respect to the repairing module 12 as well as the driving modules 14. The respective adhesive supply module 46 comprises adhesive supply elements 52 which are inserted into the driving modules 14 for supplying the adhesive to be applied as discussed above.

In FIGS. 11 to 14, the repairing robot 10 is shown in another operating mode, namely a cleaning mode.

In the cleaning mode, the adhesive apply module 34 is replaced by a cleaning module 54 that is connected with the functional interface 32 of the repairing module 12.

Accordingly, the repairing module 12 is generally configured to be coupled with different modules, namely the adhesive applying module 34 as well as the cleaning module 54 depending on the operation mode of the repairing robot 10 as will be discussed later.

In the cleaning operation mode, the repairing module 12 is also connected with the driving modules 14 in a similar manner as discussed with respect to the repairing robot 10 in the adhesive applying mode.

Thus, the only difference between both operation modes is that the adhesive applying module 34 is replaced by the cleaning module 54.

The cleaning module 54 comprises at least one cleaning brush unit 56 so that the location to be repaired 8 can be cleaned by brushing. Generally, the cleaning brush unit 56 may be used to clean the location to be repaired 8 prior to the appliance of the respective adhesive.

Figure 12:
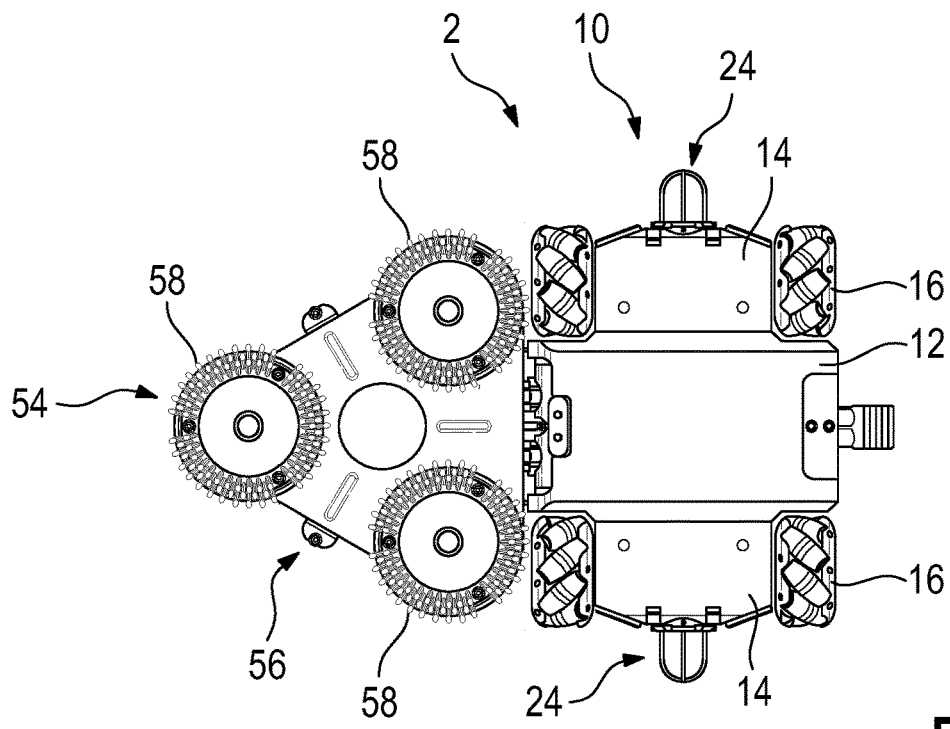
FIG. 12 shows a bottom view of the repairing robot of FIG. 11.
Figure 13:
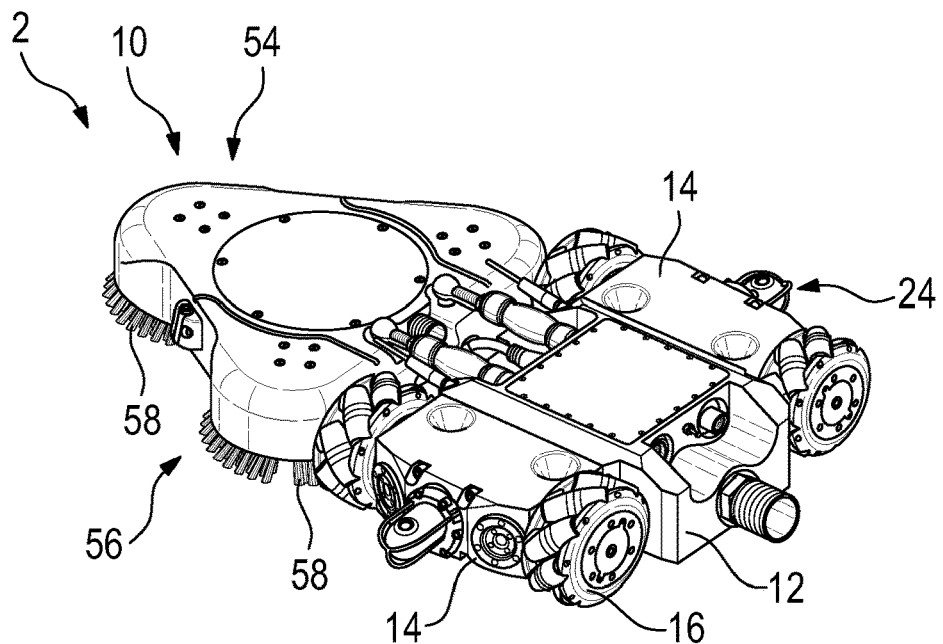
FIG. 13 shows another perspective view of the repairing robot of FIG. 11.
Figure 14:
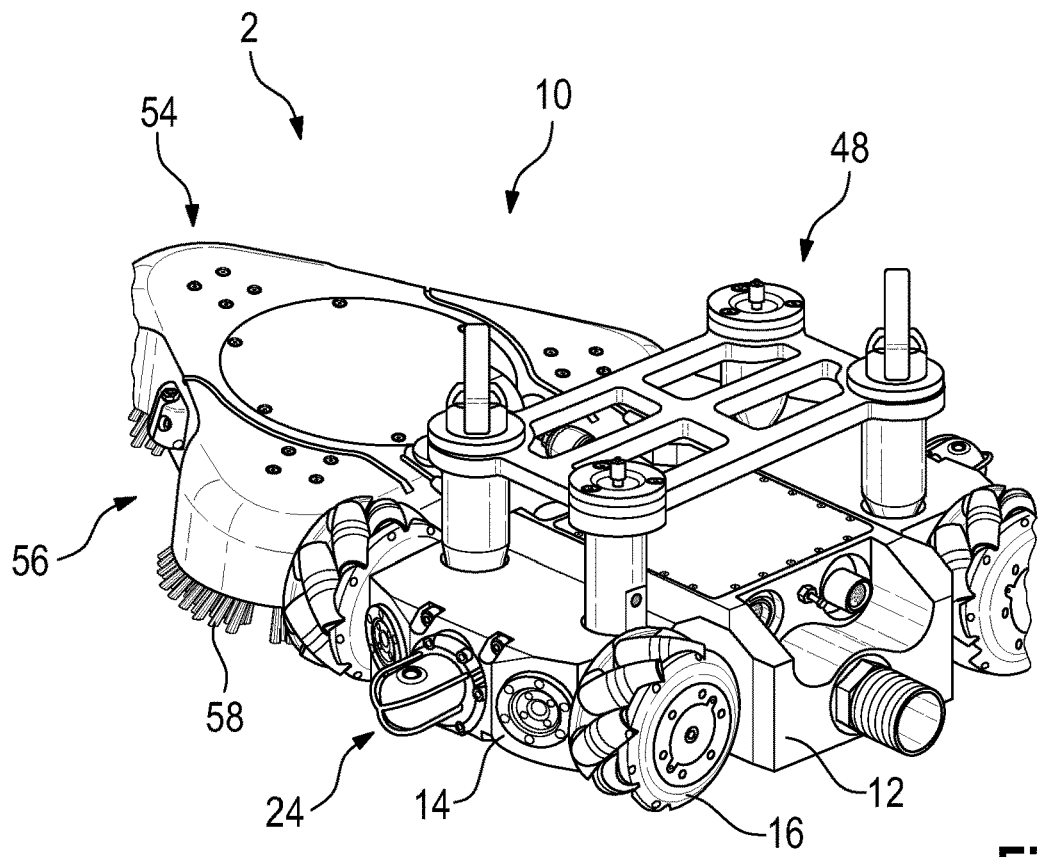
FIG. 14 shows the repairing robot of FIG. 11 in a perspective view wherein the suspension module and the adhesive supplying module are provided.

As shown in FIG. 12, the cleaning brush unit 56 comprises three separate brushes 58 each being formed in a substantial circular manner wherein each brush 59 comprises three arc-shaped portions. Hence, each brush 58 of the cleaning brush unit 56 corresponds substantially to the appliance brush 42 of the adhesive applying module 34.

The different brushes 58 can be controlled separately and/or commonly wherein the controlling of the brushes 58 may depend on a certain cleaning mode of the repairing robot 10.

Irrespective of the cleaning module 54, the adhesive applying module 34 may also be used for cleaning purposes, in particular the respective appliance brush 42. Accordingly, the appliance brush 42 is rotated for cleaning purposes wherein no adhesive is dispensed when the adhesive applying module 34 is operated in a cleaning mode.

During the cleaning process, the material brushed away may be sucked in by a suction member as well as a filter being connected to the suction member so that the material sucked in can be collected within the filter. For instance, the filter is also placed within the container 4 during the cleaning process.

As already discussed, the repairing system 2 is generally used to repair a location to be repaired 8 underwater within the container 4, for instance a (spent) fuel pool of a nuclear power plant, in particular a location 8 that cannot be reached from the top of the container 4 as shown in FIG. 1.

For doing so, the repairing system 2 uses the repairing robot 10 that is movable underwater and, therefore, remotely controlled by a control unit 60; please refer to FIG. 1.

The control unit 60 is connected with the repairing robot 10 via its control interface 31 and appropriate cables or wires 62.

The control signals as well as the signals from the repairing robot 10 may be transmitted via the cables or wires 62 so that a bidirectional communication is established.

In addition, the repairing system 2 also comprises, besides the control unit 60, an adhesive mixing machine 64 which provides the adhesive to be applied.

The adhesive mixing machine 64 as well as the control unit 60 are located outside of the container 4, for instance at a pool edge or a reactor floor next to the container 4 as shown in FIG. 1.

The adhesive mixed within the adhesive mixing machine 64 is forwarded to the repairing robot 10 via a hose 66. Alternatively, a conduit, a pipe, a line or any other suitable member is used for supplying the adhesive.

In fact, the adhesive is pumped by a pumping unit 68 of the adhesive mixing machine 64 to the repairing robot 10, in particular the adhesive applying module 46.

The adhesive mixing machine 64, in particular its pumping unit 68, is also controlled by the control unit 60.

In general, the moveable and remotely controlled repairing robot 10 is modularly structured so that several modules can be combined. This is shown in FIG. 17 wherein the modular structure of the repairing robot 10 is illustrated since several different modules of the repairing robot 10 are shown in an exploded view.

The repairing module 12 is the central module (or main module) of the repairing robot 10 that has several interfaces 18, 31, 32 that can be used for interconnecting different modules such as the driving modules 14, the adhesive applying module 34, the cleaning module 54, a location finding module 70 and/or a leakage determination module 72. For instance, the location finding module 70 is established by an alternating current field measurement module (ACFM) module whereas the leakage determination module 72 is established by a vacuum box module.

The respective modules can be coupled with the repairing module 12 simultaneously as shown in FIGS. 1 to 6 as well as FIGS. 11 to 14. Moreover, certain modules may be coupled subsequently as will be described hereinafter.

The modular structure of the repairing robot 10 is inter alia ensured by using universal interfaces ensuring a high connectivity of the repairing module 12.

Hereinafter, a repairing method is described in more detail that is performed underwater in the container 4 by using the repairing system 2 described above.

At the beginning, the components of the repairing system 2 are provided at the pool edge or the reactor floor next to the container 4, for instance the (spent) fuel pool.

Then, the modular structured repairing robot 10 is configured with respect to the desired operation mode, for instance a location finding mode, a leakage determination mode, a cleaning mode or an adhesive appliance mode.

The first three operation modes, namely the location finding mode, the leakage determination mode and the cleaning mode, may be optional. Nevertheless, the whole repairing method encompassing all operation modes are described hereinafter.

Thus, the location to be repaired 8 has to be identified at the beginning, for instance a corrosive location.

For this purpose, the location finding module 70 may be connected with the repairing module 12, in particular via the functional interface 32.

In addition, the driving modules 14 (with the camera modules 24) are coupled with the repairing module 12 via the driving interfaces 18 so that the movable and remotely controlled repairing robot 10 is established.

The repairing robot 10, in particular the repairing module 12, is connected with the control unit 60 via the cables or wires 62 connected to the control interface 31 so that the repairing robot 10 can be controlled remotely.

For placing the repairing robot 10 in the container 4, at least the suspension module 50 is connected with the repairing robot 10 so that the repairing robot 10 can be inserted into the container 4, for instance via a crane.

Then, the repairing robot 10 is controlled so as to move within the container 4 underwater wherein the respective control signals are forwarded to the driving modules 14 so that the respective wheels 16 move forwards, backwards and/or in the desired direction.

While the repairing robot 10 is driven within the container 4 underwater, the location finding module 70 checks the container 4, for instance the walls, welding spots and so on, in order to find and localize a critical location which should be repaired such as a corrosive location.

For orientation purposes, the user can navigate the repairing robot 10 due to the video(s) and/or pictures (submitted) by the camera module(s) 24 while the repairing robot 10 is moving underwater.

Once the corrosive finding module 70 identifies a location which might correspond to a leakage and/or a location having a reduced wall thickness (generally: a location to be repaired 8), the respective location is recorded so that it can be found again easily later.

As mentioned above, the location to be repaired 8 may also correspond to a location that is repaired in a preventive manner.

Then, the repairing robot 10 may be removed from the container 4 for replacing the location finding module 70 by the leakage determination module 72 in order to determine whether or not the location corresponds to a leakage. Therefore, the location finding module 70 is decoupled from the repairing module 12 which is coupled with the leakage determination module 72, in particular via the functional interface 32.

However, the location finding module 70 and the leakage determination module 72 may be integrated so that a possible leakage can be identified right after the respective critical location was identified by the location finding module 70.

Afterwards, the location to be repaired 8, which was identified previously, in particular with regard to a possible leakage, may be cleaned by the cleaning module 54 so that the location 8 is prepared for adhesive appliance.

Thus, the repairing robot 10 may be removed (again) from the container 4 so that the cleaning module 54 can be coupled with the repairing module 12 via the functional interface 32. The repairing robot 10 is in a cleaning operation mode wherein, in the cleaning operation mode, the repairing robot 10 may substantially correspond to the repairing robot 10 shown in FIGS. 11 to 14.

However, the location finding module 70 and/or the leakage determination module 72 may also be coupled to another interface than the functional interface 32 so that the repairing module 12 may already be coupled with the cleaning module 54 as well as the location finding module 70 and/or the leakage determination module 72 at the beginning.

Hence, the location to be repaired 8 can be localized by the location finding module 70, a possible leakage is identified by the leakage determination module 72 and, afterwards, the location to be repaired 8 can be cleaned by the cleaning module 54 without lifting the repairing robot 10 out of the container 4.

The repairing robot 10 with the cleaning module 54 coupled to the repairing module 12 is moved to the respective location to be repaired 8 in a remotely controlled manner.

Once the repairing robot 10 reaches the location to be repaired 8 underwater, the cleaning module 54, in particular the at least one cleaning brush unit 56, cleans the location to be repaired 8 so that any deposits and/or residues are brushed away by the at least one cleaning brush unit 56, in particular the several brushes 58 of the cleaning brush unit 56. The deposits and/or residues are brushed away are sucked in by the suction member wherein the respective material is collected in the filter which might be emptied later.

After the location to be repaired 8 was cleaned, the repairing robot 10 is (again or for the first time) lifted out of the container 4 (via the crane and the suspension module 50). Then, the cleaning module 54 can be decoupled from the repairing module 12 so that the adhesive applying module 34 can be connected to the repairing module 12 via the functional interface 32. Hence, the repairing robot 10 is in the adhesive appliance operation mode so that the repairing robot 10 substantially corresponds to the one shown in FIGS. 2 to 6.

Afterwards, the repairing robot 10 is placed, in particular abseiled, in the container 4 and driven underwater to the respective location to be repaired 8 in a remotely controlled manner.

Once the repairing robot 10 having the adhesive applying module 34 reaches the location to be repaired 8 which was cleaned previously, the adhesive to be applied is forwarded to the adhesive applying module 34 via the adhesive mixing machine 64 and the adhesive supply module 46 such that the adhesive is dispensed via the outlet 40 of the adhesive applying module 34 on the location to be repaired 8. The outlet 40 may be established by a (conventional) nozzle.

During the dispensing of the adhesive, the at least one appliance brush 42 of the adhesive applying module 34 is driven so that the appliance brush 42 rotates. Hence, the medium surrounding the location to be repaired 8, for instance the acid medium, is pushed away by the rotating appliance brush 42. Thus, the location to be repaired 8 is laid bare which ensures that the adhesive can be directly applied on the location to be repaired 8.

Moreover, the repairing robot 10 is controlled to move forwards and/or backwards during the adhesive appliance so that the appliance brush 42 comes in contact with the adhesive dispensed as well as the location to be repaired 8.

Due to the movement of the repairing robot 10 and/or the rotation of the appliance brush 42, the adhesive is brushed in or brushed onto the location 8.

For instance, the appliance brush 42 is rotated by 1 to 300 rounds per minute. However, the adhesive may also applied without rotating the appliance brush 42. Moreover, the repairing robot 10 has a velocity of 5 to 100 cm/min. The adhesive applied on the location to be repaired 8 may have a width of 100 to 200 mm. Further, the thickness of the adhesive applied on the location to be repaired 8 may vary between 0.5 and 10 mm.

In general, the adhesive used may be a self-leveling adhesive, for instance a polymer adhesive, in particular an epoxy adhesive. The adhesive itself may be radiation resistant. Moreover, the adhesive may be a two-component adhesive being mixed prior to its application by the adhesive mixing machine 64. The adhesive mixing machine 64 may mix the adhesive to be applied by mixing at least a resin as well as a hardener (curing agent).

Afterwards, the self-leveling adhesive is pumped by the pumping unit 68 of the adhesive mixing machine 64, for instance by a flow rate of 50 to 500 ml/min.

In general, the self-leveling adhesive may be applied on the location to be repaired 8 when the repairing robot 10 moves backwards so that it is ensured that the repairing robot 10 is not driven over the location to be repaired 8 on which the adhesive has been applied previously.

Furthermore, the appliance brush 42 can also be used as a cleaning brush so that the adhesive applying module 34 is also the cleaning module 54. Accordingly, the respective modules 34, 54 do not have to be interchanged improving the required time for repairing the respective location 8.

For instance, the location to be repaired 8 is cleaned by the appliance brush 42 when the repairing robot 10 is driven forwards along the location 8, in particular a weld, wherein the appliance brush 42 is driven so as to rotate in order to remove the deposits and/or residues. Afterwards, the adhesive is applied by the adhesive applying module 34 when the repairing robot 10 is driven backwards.

In general, the appliance brush 42 may not be rotated during the appliance of the adhesive.

Alternatively to the separately formed adhesive supply module 46, the adhesive may be supplied directly to the adhesive applying module 34.

Accordingly, the adhesive is applied on the location to be repaired 8 underwater wherein the repairing system 2 ensures that locations can be repaired which cannot be reached from the top of the container 4 since the remotely controlled repairing robot 10 is driven to the respective location 8, for instance a location under the rack 6 which cannot be accessed from the top of the container 4.

In the shown embodiment, the repairing robot 10 is driven along the bottom wall of the container 4 wherein each and everywhere location assigned to the bottom wall of the container 4 can be accessed by the movable repairing robot 10.

What is claimed is:

1. A repairing system for applying an adhesive to a location to be repaired underwater in a container, the system comprising:
    a movable and remotely controlled repairing robot that is configured to be driven underwater, the repairing robot comprising a repairing module, the movable and remotely controlled repairing robot being constructed modularly, the repairing module being a central repairing module that provides respective interfaces for connecting further modules, the repairing module being configured to be coupled with an adhesive applying module, the adhesive applying module being configured to dispense an adhesive on the location to be repaired, the repairing module comprising two driving interfaces each configured to be coupled with a corresponding driving module having at least one wheel, which ensures the movability of the repairing robot;
    the repairing module being configured to be coupled with a cleaning module; and
    the repairing module having a functional interface configured to be coupled with the adhesive applying module and the cleaning module selectively.

2. The system of claim 1, wherein the cleaning module comprises at least one cleaning brush unit.

3. The system of claim 1, wherein the adhesive applying module comprises an appliance brush.

4. The system of claim 3, wherein the adhesive applying module has an outlet for dispensing the adhesive on the location to be repaired, and wherein the outlet is assigned to the appliance brush.

5. The system of claim 1, wherein the repairing module is configured to be coupled with a location finding module and/or a leakage determination module.

6. The system of claim 1, further comprising at least one camera module.

7. A repairing method to be performed underwater in a container using the repairing system as recited in claim 1, the method comprising:
 driving the movable and remotely controlled repairing robot underwater to the location to be repaired within the container; and
 applying an adhesive on the location to be repaired underwater, the adhesive being brushed on the location to be repaired underwater.

8. The repairing method according to claim 7, further comprising cleaning the location to be repaired prior to the appliance of the adhesive.

9. The repairing method according to claim 7, localizing the location to be repaired by using an Alternating Current Field Measurement (ACFM) technique and/or by determining an amount of leakage.

10. A repairing system for applying an adhesive to a location to be repaired underwater in a container, the system comprising:
 a movable and remotely controlled repairing robot that is configured to be driven underwater, the repairing robot comprising a repairing module, the movable and remotely controlled repairing robot being constructed modularly, the repairing module being a central repairing module that provides respective interfaces for connecting further modules, the repairing module being configured to be coupled with an adhesive applying module, the adhesive applying module being configured to dispense an adhesive on the location to be repaired, the repairing module comprising two driving interfaces each configured to be coupled with a corresponding driving module having at least one wheel, which ensures the movability of the repairing robot; and
 the adhesive applying module comprising a rotating appliance brush.

* * * * *